E. F. LEAHY.
MEASURE.
APPLICATION FILED APR. 16, 1907.

902,306.

Patented Oct. 27, 1908.

Witnesses:

Inventor:

UNITED STATES PATENT OFFICE.

ELIZABETH F. LEAHY, OF NEW YORK, N. Y.

MEASURE.

No. 902,306.  Specification of Letters Patent.  Patented Oct. 27, 1908.

Application filed April 16, 1907. Serial No. 368,563.

*To all whom it may concern:*

Be it known that I, ELIZABETH F. LEAHY, a citizen of the United States, residing in the borough of Brooklyn, county of Kings, city and State of New York, have invented certain new and useful Improvements in Measures, of which the following is a specification.

This invention relates to certain improvements in measures, and more particularly in limp tape-measures, such as are commonly made from woven material, and the object of the invention is to provide a measure of this general character of a simple and comparatively inexpensive nature having certain features of novelty whereby the handling of the measure is facilitated and greater convenience is afforded in the use thereof.

The novel features of the invention will be carefully defined in the claims.

Figure 1:
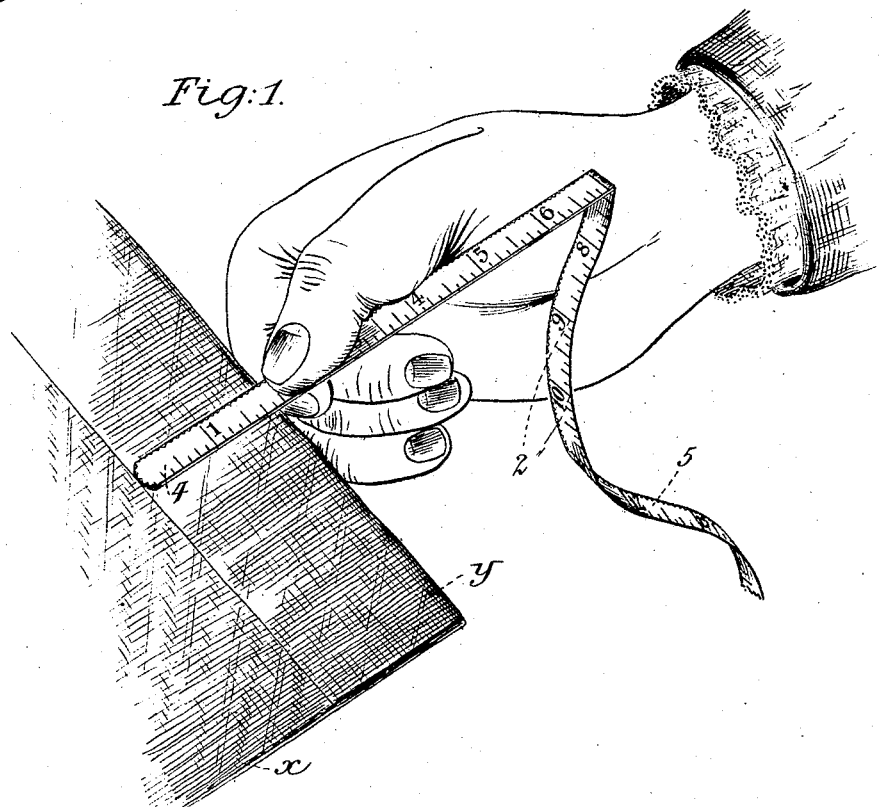
Figure 2:
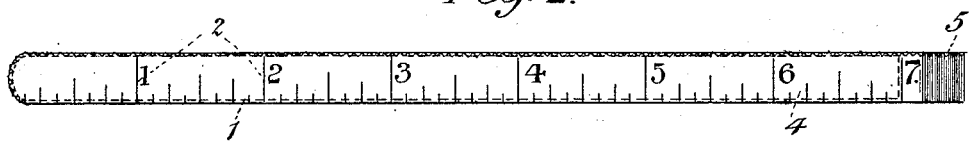
Figure 3:
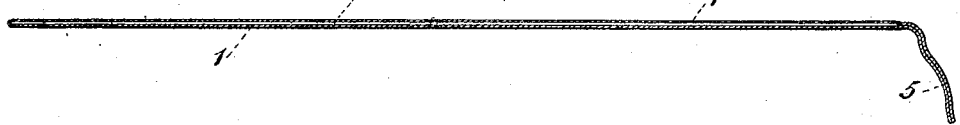

In the accompanying drawings which serve to illustrate my improvements Figure 1 is a perspective view showing a measure constructed according to my invention; Fig. 2 is a face view, drawn to an enlarged scale and showing an end portion of the measure embodying my improvements; Fig. 3 is a sectional view taken lengthwise through the improved measure as shown in Fig. 2.

As shown in these views, the improved measure comprises a limp or non self-supporting part or strip, such as is usually made from woven fabric and whereon are printed or otherwise produced, graduations 2 of any preferred kind, dependent upon the use to which the improved measure is to be put. As herein shown, said flexible part or strip 1 is made in tubular form, being folded to produce two plies lapped one upon the other, and having their edges secured by a longitudinal seam. This feature, however, and the manufacture of the measure from woven material, are not essential to the broad principles and spirit of the present invention.

To the end or ends of the tape-measure is applied a stiffening strip or strips to make self-supporting the otherwise limp end portions of the tape-measure. The preferred construction is where the stiffening strips are applied to both ends of the measure. Said strips may consist of whalebone, thin spring-metal, or the like, the idea being to give self-supporting quality to the limp material of the tape measure without interfering with its easy flexibility. In other words, the strip 3 while self-supporting is not rigid or non-flexible. By self-supporting will be understood the quality of the strip or tape-measure end of holding itself extended without collapse when held in horizontal position supported at one end only.

The strip 3 can be applied to the tape-measure in a number of ways, that shown being by inserting it inside the tubular measure so as to be located at the end thereof between its two plies. Thus the tape-measure of my present invention will consist in its preferred form of a measure in which about six inches at each end are self-supporting with the rest of the measure, that is to say the portion connecting the ends, limp or non self-supporting.

The utility of this improved tape-measure and its advantages over the ordinary tape-measure, limp throughout, are very marked in the hands for instance, of a dressmaker, or tailor. Thus, to get the height of a skirt above the floor, it is only necessary to hold the end of the measure with one hand in vertical position to the floor with its end resting against it, whereupon the height of the bottom of the skirt can be read. Whereas with the ordinary tape-measure in the first place two hands have to be used and in the second place, much care has to be taken that the point of the tape-measure in contact with the floor is the zero point on its graduations. Similarly the improved tape-measure has marked advantages in making all sorts of other short measurements in directions vertical, horizontal, or otherwise, since the ends being self-supporting, only one hand is required to manipulate the tape-measure, while the other is left free to manipulate chalk, pins, or scissors, as the case may be.

The fact that the tape-measure of my present invention is stiffened and rendered self-supporting for only a comparatively small portion of its length, is a vital part of the invention, since if the stiffening be extended beyond the comparatively short ends, for example to the entire length of the tape-measure, its value to the dressmaker is destroyed because its stiffness and springiness will not allow it to conform to irregular, angular, or abruptly curved surfaces and consequently make it impossible to obtain accurate measurements. Whereas in the present measure the stiffening ends are so short that the same measurements can be obtained as with the ordinary tape-measure limp throughout.

Having thus described my invention, what

I claim and desire to secure by Letters Patent is—

In combination, a limp tape-measure, and a short piece of flexible, springy material, combined with an end of the limp tape-measure and adapted to make said end self-supporting, flexible and springy.

In witness whereof I have hereunto signed my name this 15 day of April, 1907, in the presence of two subscribing witnesses.

ELIZABETH F. LEAHY.

Witnesses:
WILLIAM J. FIRTH,
H. G. HOSE.